(12) United States Patent
Chakravarthy et al.

(10) Patent No.: US 7,549,400 B2
(45) Date of Patent: Jun. 23, 2009

(54) METHOD OF HEATING BOILER PROCESS FEED STREAMS

(75) Inventors: Vijayaraghavan Srinivasan Chakravarthy, Williamsville, NY (US); Bart A. van Hassel, Getzville, NY (US); M. Mushtaq Ahmed, Pittsford, NY (US)

(73) Assignee: Praxair Technology, Inc., Danbury, CT (US)

( * ) Notice: Subject to any disclaimer, the term of this patent is extended or adjusted under 35 U.S.C. 154(b) by 421 days.

(21) Appl. No.: 11/633,758

(22) Filed: Dec. 5, 2006

(65) Prior Publication Data

US 2008/0127911 A1 Jun. 5, 2008

(51) Int. Cl.
*F22G 1/00* (2006.01)

(52) U.S. Cl. .............. 122/483; 122/7 R; 122/460; 122/465

(58) Field of Classification Search .............. 95/54; 122/135.1
See application file for complete search history.

(56) References Cited

U.S. PATENT DOCUMENTS

| | | | |
|---|---|---|---|
| 5,657,624 A | 8/1997 | Kang et al. | 60/39.02 |
| 5,865,878 A * | 2/1999 | Drnevich et al. | 95/54 |
| 6,382,958 B1 | 5/2002 | Bool, III et al. | 431/2 |
| 6,394,043 B1 | 5/2002 | Bool, III et al. | 122/488 |
| 6,562,104 B2 | 5/2003 | Bool, III et al. | 95/54 |
| 6,702,570 B2 * | 3/2004 | Shah et al. | 431/11 |
| 6,921,596 B2 | 7/2005 | Kelly et al. | 429/17 |

FOREIGN PATENT DOCUMENTS

| | | |
|---|---|---|
| WO | 9910945 | 3/1999 |
| WO | 03107463 | 12/2003 |

OTHER PUBLICATIONS

Fraga et al., "A Visual Representation of Process Heat Exchange As A Basis For User Interaction And Stochastic Optimization", 2001, pp. 765-776, vol. 79, Part A.

* cited by examiner

*Primary Examiner*—Steven B McAllister
*Assistant Examiner*—Robert E Thomas
(74) *Attorney, Agent, or Firm*—David M. Rosenblum

(57) ABSTRACT

A method of heating process streams fed to a boiler incorporating an oxygen transport membrane device that includes an oxygen-containing stream and a boiler feed water stream. The membrane device separates oxygen to support combustion of a fuel and generate heat to raise the steam. Heat is recovered and process streams are heated by separately heating portions of the oxygen-containing stream and the boiler feed water stream with a retentate stream produced from the oxygen separation and a flue gas stream generated from the combustion. The flow rate of the portion of the oxygen-containing stream heated by the retentate stream is greater than that heated by the flue gas stream to help minimize heat transfer area and thus, fabrication costs. Also, water is condensed from the flue gas stream during the heat exchange involved in the heat recovery to increase thermodynamic efficiency.

7 Claims, 4 Drawing Sheets

METHOD OF HEATING BOILER PROCESS FEED STREAMS

FIELD OF THE INVENTION

The present invention relates to a method of heating process streams fed to a boiler in which the process streams include a boiler feed water stream and an oxygen-containing stream and the boiler utilizes an oxygen transport membrane device to separate oxygen from the oxygen-containing stream to support combustion of the fuel stream to in turn generate heat to produce steam by heating the boiler feed water stream with a retentate stream and a flue gas stream. More particularly, the present invention relates to such method in which heat is recovered and the process streams are heated by separately heating portions of the oxygen-containing stream and the boiler feed water stream with the retentate stream and the flue gas stream.

BACKGROUND OF THE INVENTION

A variety of boilers and like devices have been proposed in the prior art that make use of oxygen transport membranes to separate oxygen from a heated oxygen-containing feed to support combustion of a fuel. The heat produced by such combustion can be indirectly transferred to boiler feed water flowing within steam tubes to raise steam. A central advantage of such boilers and devices is that carbon dioxide produced by the combustion can be sequestered for environmental purposes and for use in other processes.

Oxygen transport membranes are known devices that incorporate a ceramic material that is capable of oxygen ion transport at elevated temperatures. When an oxygen-containing gas is exposed to one side of the membrane, conventionally known as a cathode side, the oxygen is ionized and oxygen ions are transported through the membrane to the opposite side known as the anode side. The oxygen ions react with a fuel species that consumes the oxygen ions. This consumption of oxygen ions creates a partial pressure difference of oxygen between the cathode side and the anode side of the membrane that provides a driving force for the oxygen ion transport. The partial pressure difference can also be created by compressing a feed stream containing the oxygen and/or reducing the pressure on the anode side.

Electrons are made available for oxygen ionization at the cathode side by electrons being lost from the oxygen ions at the anode side. Certain ceramic materials, formed from perovskites, exhibit both oxygen ion and electron conductivity and thus are known as mixed conductors. In such materials, the electrons flow through the material from the anode to the cathode side. Other ceramic materials are ionic conductors and are capable of only ionic transport. Such materials are thus used in combination with an electrically conductive phase for the electron transport or with an external circuit for electrical circuit. A typical example of such an ionic conductor is yttrium stabilized zirconia.

As indicated above, the heat generated by the combustion of the fuel introduced to the anode side of the membrane can be used to generate steam. Membranes utilized in such boilers can be driven under a positive oxygen partial pressure that is produced by combusting a fuel at the anode side of the membrane. For example, in U.S. Pat. No. 6,394,043 a boiler is disclosed in which steam tubes and ceramic membrane elements are interspersed. Fuel is introduced into the device that reacts with oxygen ions that have been transported through the membrane to generate heat to raise steam in boiler feed water flowing within the steam tubes. This type of boiler has been optimized in a paper entitled, "Cost and Feasibility Study on the Praxair Advanced Boiler for the $CO_2$ Capture Project Refinery Scenario", Switzer et al., Elsevier (2005). In this paper a boiler is illustrated having rows of oxygen transport membrane tubes located within a housing and alternating with steam tubes to superheat saturated steam by combustion of a fuel supported by oxygen separation. The resulting heated and oxygen depleted retentate is used to heat heated boiler feed water and thereby to generate the saturated steam. Such heating takes place within the housing upstream of the oxygen transport membrane tubes. Part of the flue gas is recirculated, mixed with the fuel and also introduced into the housing.

As can be appreciated, it is desirable to recover heat energy from both the heated flue gas stream and the retentate stream for use in preheating the air feed to the oxygen transport membrane device and for heating boiler feed water. In Switzer, the incoming air is heated against flue gas after having passed through a heat exchanger being used to preheat the boiler feed water. Preheated air is passed through a heat exchanger in which the air is further heated by the retentate stream after having been used to generate the saturated steam. Thereafter, the retentate stream flows into another heat exchanger to further heat the boiler feed water.

The boiler, described above and like systems, operates at high temperatures and therefore require that the air be preheated to a temperature of generally about 900° C. Such high temperature operation requires expensive, high temperature heat exchangers that are necessary to recover heat and thereby capture a sufficient thermal efficiency to make the use of such boilers and systems practical. As will be discussed, the present invention provides an inherently efficient process for recovering heat energy and thereby heating the oxygen-containing stream, the boiler feed water stream and the fuel stream that optimizes the use of the heat exchangers to decrease the costs involved in fabricating such boilers.

SUMMARY OF THE INVENTION

The present invention provides a method of heating process streams fed to boiler utilizing an oxygen transport membrane unit. In accordance with the method, the process streams that are fed to the boiler include a heated boiler feed water stream and a heated oxygen-containing stream.

The heated boiler feed water stream is heated within the boiler through indirect heat exchange with a retentate stream and a flue gas stream to generate steam. The flue gas stream is produced by combustion of a fuel supported by oxygen separated from the heated oxygen-containing stream by the oxygen transport membrane device. The separation of the oxygen thereby also produces the retentate stream with a higher mass flow rate than the flue gas stream.

Heat is indirectly transferred from the retentate stream to a first subsidiary oxygen-containing stream and thereafter, to a first subsidiary boiler feed water stream. The heat exchange produces a heated first subsidiary oxygen-containing stream and a first heated boiler feed water stream. The flue gas stream indirectly exchanges further heat to a second subsidiary oxygen-containing stream and thereafter, to a second subsidiary boiler feed water stream, thereby to produce a second heated oxygen-containing stream and a second heated boiler feed water stream.

The heated first subsidiary oxygen-containing stream and the heated second subsidiary oxygen-containing stream are combined to form the heated oxygen-containing stream and the heated first boiler feed water stream and the heated second boiler feed water stream are combined to form the heated boiler feed water stream.

The heat exchange area required for the indirect heat exchange between the retentate stream and the flue gas stream to the oxygen-containing stream and the boiler feed water stream is minimized by providing the first oxygen-containing stream with a greater mass flow rate than that of the second oxygen-containing stream. This minimization of the required heat transfer area for the heat recovery allows fabrication costs to be reduced.

In an embodiment of the present invention, the water condenses during the indirect heat exchange of the flue gas stream and the second boiler feed water stream. This increases overall thermal efficiency of the heat recovery process.

The indirect heat exchange between the retentate stream and the first subsidiary oxygen-containing stream and the flue gas stream and the second subsidiary oxygen-containing stream are each conducted within two heat exchangers operating at higher and lower temperatures and upstream of the indirect heat exchange with the first boiler feed water stream and the second boiler feed water stream. The use of higher and lower operational temperatures for such heat exchangers allows fabrication costs to be further reduced by the reduction of the requirement for the use of expensive high temperature materials.

In an alternative embodiment, the indirect heat exchange between the retentate stream and the first subsidiary oxygen-containing stream and the flue gas stream and the second subsidiary oxygen-containing stream are each conducted within two heat exchangers operating at higher and lower temperatures. The indirect heat exchange of the retentate stream and the first boiler feed water stream and the indirect heat exchange of the flue gas stream and the second boiler feed water stream occurring between the two heat exchangers. In such embodiment, water may condense during the indirect heat exchange of the flue gas stream with the second subsidiary oxygen-containing stream and within the other of the two heat exchangers. This embodiment is applicable for situations in which the boiler feed water is available at high temperature. Again, such embodiment minimizes the use of expensive high temperature materials required for heat exchange at high temperatures.

The heated oxygen-containing stream can be further heated by introducing the oxygen-containing stream into a duct burner and combusting a fuel within the duct burner. In any embodiment, the oxygen-containing stream can be air.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

The same reference numbers having been used in the Figures for elements having the same description to avoid needless repetition in the description of such elements.

DETAILED DESCRIPTION

Figure 1:
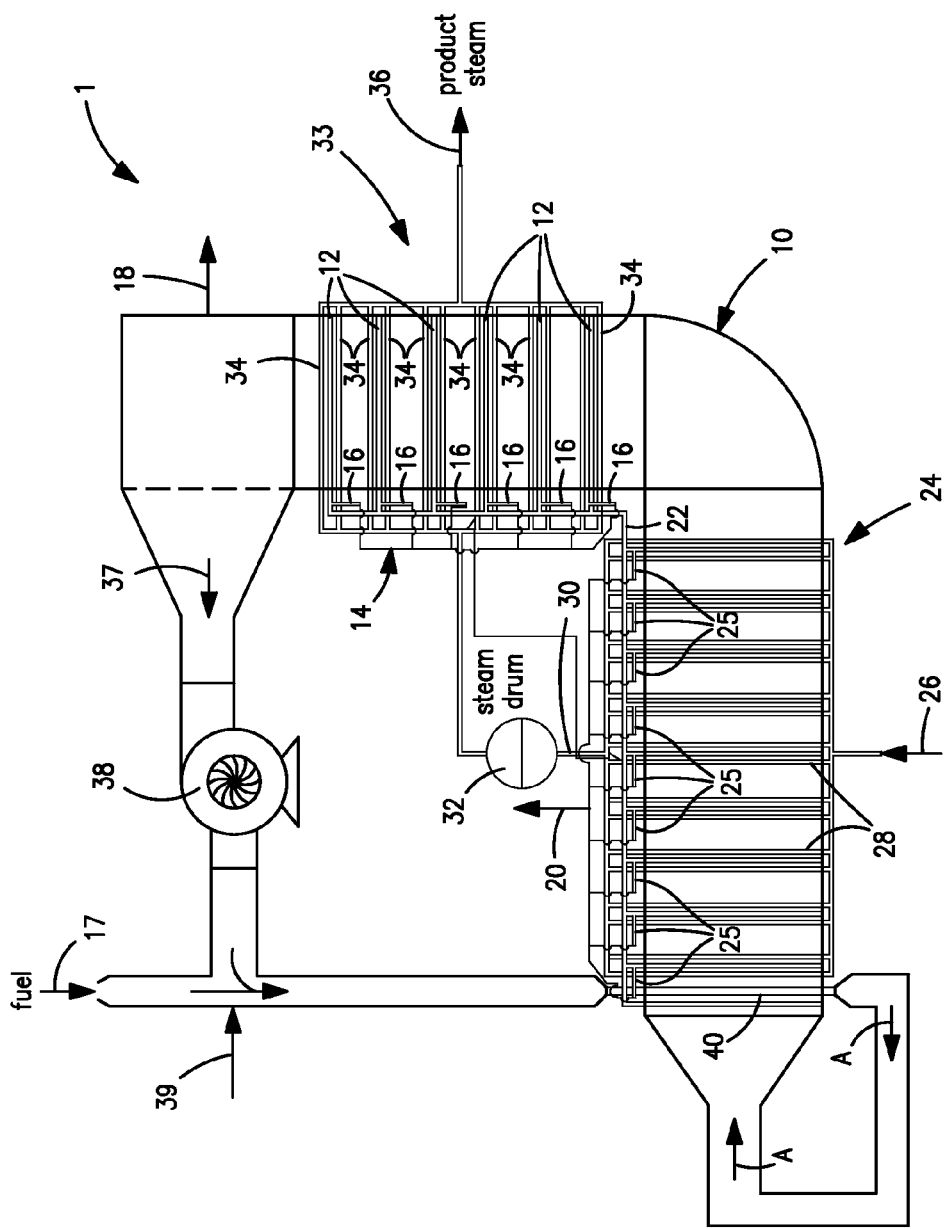
FIG. 1 is a schematic, sectional view of a boiler used in connection with the present invention.

With reference to FIG. 1, a boiler 1 is illustrated that is to be used in connection with a method in accordance with the present invention. It is understood, however, that boiler 1 is discussed herein for exemplary purposes and is not intended to limit the application of the present invention as the present invention has application to similar devices in which, as will be discussed, water is heated to steam by heat generated through combustion supported by oxygen ion transport.

Boiler 1 is provided with a housing 10 that contains an oxygen transport membrane device formed by tubular oxygen transport membrane tubes 12. In boiler 1, oxygen transport membrane tubes 12 are formed from a dual phase conductor, that is, a mixture of ionic and electronically conducting phases. However, it is understood that the present invention would have equal applicability to a boiler incorporating oxygen transport materials formed by mixed conductors or ionic conductors used in a manner described above and also, possibly for combined cycles in which the oxygen ion transport occurred within a fuel cell type of device incorporating an ionic conducting membrane.

A heated oxygen-containing stream 14 is introduced into the interior of oxygen transport membrane tubes 12 through inlets 16. At the same time, a heated fuel stream 17 is introduced into housing 10 to combust at the outer surface of oxygen transport membrane tubes 12 by combination with oxygen ions permeating through oxygen transport membrane tubes 12. The consumption of oxygen ions establishes a partial pressure differential to drive oxygen ion transport through oxygen transport membrane tubes 12 and electronic transport to ionize the oxygen contained within heated oxygen-containing stream 14 to accomplish the oxygen separation. As a result of this separation operation, a flue gas stream 18 is created that is discharged from the housing 10 of boiler 1 and a retentate stream 20 that by way of conduit 22 is introduced into a heat recovery steam generator 24 and discharged from outlets 25 thereof.

A heated boiler feed water stream 26 is introduced into steam tubes 28 of heat recovery steam generator 24 and is indirectly heated by retentate contained in retentate stream 20 to form a saturated steam stream that by way of conduit 30 is collected in steam drum 32. The saturated steam is thereafter introduced into a heat recovery steam generator 33 having steam tubes 34 intermingled with oxygen transport membrane tubes 12 to superheat the steam through indirect heat exchange with the flue gas that is evolved from the combustion occurring at the outer surfaces of oxygen transport membrane tubes 12 and that is discharged as flue gas stream 18. The superheating thereby forms a product steam stream 36 that is discharged from boiler 1 for use in downstream processes.

As illustrated, fuel stream 17 can be combined with a recirculated subsidiary flue gas stream 37 with the use of a recirculation blower 38. A steam stream 39 can then be combined to adjust the steam to carbon ratio in the fuel to be combusted to control carbon formation on oxygen transport membrane tubes 12. The combined stream is then preheated in a preheater 40 and passed through heat recovery steam generator 24 and to the oxygen transport membranes 12 as indicated by the arrowheads "A".

Figure 2:
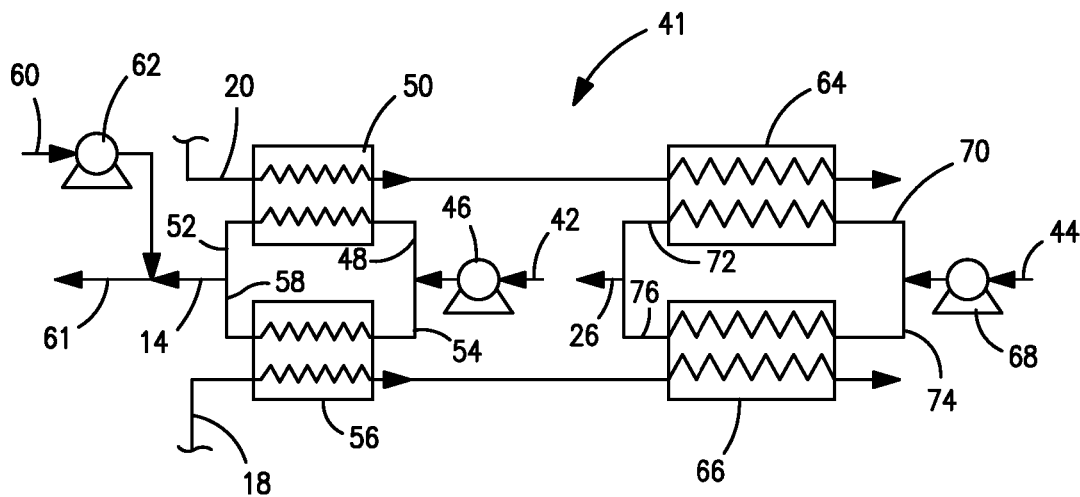
FIG. 2 is a schematic, fragmentary process flow diagram of a heat recovery system of the present invention.

With reference to FIG. 2, heat from retentate stream 20 and flue gas stream 18 is recovered by a heat recovery network 41 that is designed to carry out a method in accordance with the present invention for heating oxygen-containing stream 42 and a boiler feed water stream 44 to form heated oxygen-containing stream 14 and heated boiler feed water stream 26 that constitute the process streams being fed to boiler 1.

Oxygen-containing stream 42, for example, air, is introduced into a heat recovery flow network 41 and eventually boiler 1 by way of a blower 46. No compression is required given that the combustion of the fuel drives the transport. It is to be noted, however, that the present invention has applicability to a system in which oxygen ion transport is driven by a positive total pressure and as such, the oxygen-containing stream 42 could be compressed for such purposes. A first subsidiary oxygen-containing stream 48 derived from oxygen-containing stream 42 is introduced into a heat exchanger 50 to effect indirect heat exchange with retentate stream 20 and thereby to produce a heated first subsidiary oxygen-containing stream 52. At the same time a second subsidiary oxygen-containing stream 54 derived from oxygen-containing stream 42 is introduced to a heat exchanger 56 to effect indirect heat exchange with flue gas stream 18 and thereby form a heated second subsidiary oxygen-containing stream 58. First heated subsidiary oxygen-containing stream 52 and second heated subsidiary oxygen-containing stream 58 are then combined to form heated oxygen-containing stream 14. Optionally, a fuel stream 60 can be also combined with heated oxygen-containing stream 14 within a duct burner 61 by means of a blower 62 for partial combustion and further heating of the heated oxygen-containing stream 14.

Retentate stream 20 after passage through heat exchanger 50 and flue gas stream 18 after passage through heat exchanger 56 are then introduced into heat exchangers 64 and 66 that are located downstream of heat exchangers 50 and 56 used in heating oxygen-containing stream 42. Boiler feed water stream 44 is pumped by a pump 68 and thereby pressurized to a desired operational pressure of product steam stream 36. A first subsidiary boiler feed water stream 70 made up of boiler feed water stream 44 is heated by retentate stream 20 within heat exchanger 64 to produce first heated subsidiary boiler feed water stream 72. A second subsidiary boiler feed water stream 74, also made up of boiler feed water stream 44, is heated by flue gas stream 18 within heat exchanger 66 to form second heated subsidiary boiler feed water stream 76. First heated subsidiary boiler feed water stream 72 is then combined with second heated subsidiary boiler feed water stream 76 to form heated boiler feed water stream 26.

It is to be noted that all of the heat exchangers 50, 56, 64 and 66 can be of shell and tube design. In order to increase the thermal efficiency of the heat exchange process, water contained in flue gas stream 18 can be condensed within heat exchanger 66 as the dew point for such water is at a high temperature and the heat of condensation is therefore significant and can be recovered within second subsidiary boiler feed water stream 74. However, since flue gas stream 18 also contains carbon dioxide, the resulting acid can be corrosive and require special materials in the fabrication of heat exchanger 66 that can increase the fabrication costs.

As described above, a process of the present invention is conducted with the aim of reducing the costs involved in fabricating the heat exchangers, described above, in the heat recovery network 41. As indicated above, the mass flow rate of retentate stream 20 is greater than that of flue gas stream 18 by virtue of the fact that air contains about 80 percent nitrogen. By diverting the flow within oxygen-containing stream 42 into first subsidiary oxygen-containing stream 48 that is subjected to indirect heat exchange with the retentate stream 20 having the higher mass flow rate than flue gas stream 18, temperature differences at the inlet and outlet of heat exchanger 50 between the streams can be minimized to also increase the amount of heat able to be transferred. As a result, a product of the heat transfer coefficient and area is reduced in heat exchanger 50. Since there is a closer flow rate match in heat exchanger 56 and less heat will be transferred the size of heat exchanger 56 can be optimized. The resulting closer correspondence of outlet temperatures of the retentate stream 20 and the flue gas stream 18 upon their discharge from heat exchangers 50 and 56 allows for a closer approach in temperatures at the downstream heat exchangers 64 and 66 used in heating boiler feed water stream 44 to also result in an area savings for the total required heat exchange.

A calculated example in tabular form is set forth below for the operation of the heat recovery network 41 illustrated in FIG. 2.

TABLE

| Stream # | Vapor Fraction | Temperature C. | Pressure [psia] | Mass Flow [lb/hr] | Composition | | | | | |
|---|---|---|---|---|---|---|---|---|---|---|
| | | | | | Methane | Ethane | Nitrogen | Oxygen | CO2 | H2O |
| 42 | 1.00 | 25 | 14.7 | 121500 | 0 | 0 | 0.79 | 0.21 | 0 | 0 |
| 42 after blower 46 | 1.00 | 55 | 19 | 121500 | 0 | 0 | 0.79 | 0.21 | 0 | 0 |
| 14 | 1.00 | 550 | 18 | 121500 | 0 | 0 | 0.79 | 0.21 | 0 | 0 |
| 60 | 1.00 | 25 | 14.7 | 1028 | 0.95 | 0.03 | 0.02 | 0 | 0.01 | 0 |
| 60 after blower 62 | 1.00 | 44 | 18 | 1028 | 0.95 | 0.03 | 0.02 | 0 | 0.01 | 0 |
| 14 after firing within duct burner 61 | 1.00 | 882 | 18 | 122500 | 0 | 0 | 0.78 | 0.18 | 0.01 | 0.03 |
| 20 | 1.00 | 600 | 16.5 | 105600 | 0 | 0 | 0.89 | 0.06 | 0.02 | 0.03 |
| 20 after passage through heat exchanger 50 | 1.00 | 150 | 15.5 | 105600 | 0 | 0 | 0.89 | 0.06 | 0.02 | 0.03 |

TABLE-continued

| Stream # | Vapor Fraction | Temperature C. | Pressure [psia] | Mass Flow [lb/hr] | Composition | | | | | |
|---|---|---|---|---|---|---|---|---|---|---|
| | | | | | Methane | Ethane | Nitrogen | Oxygen | CO2 | H2O |
| 20 after passage through heat exchanger 64 | 1.00 | 70 | 14.8 | 105600 | 0 | 0 | 0.89 | 0.06 | 0.02 | 0.03 |
| 44 | 0.00 | 25 | 14.7 | 100000 | 0 | 0 | 0 | 0 | 0 | 1 |
| 44 after having been pressurized by pump 44 | 0.00 | 25 | 140.5 | 100000 | 0 | 0 | 0 | 0 | 0 | 1 |
| 26 | 0.00 | 97 | 140 | 100000 | 0 | 0 | 0 | 0 | 0 | 1 |
| 18 | 1.00 | 600 | 16.5 | 21330 | 0 | 0 | 0 | 0.01 | 0.33 | 0.65 |
| 18 after passage through heat exchanger 56 | 1.00 | 257 | 15.5 | 21330 | 0 | 0 | 0 | 0.01 | 0.33 | 0.65 |
| 18 after passage through heat exchanger 66 | 0.50 | 70 | 14.8 | 21330 | 0 | 0 | 0 | 0.01 | 0.33 | 0.65 |

Figure 3:
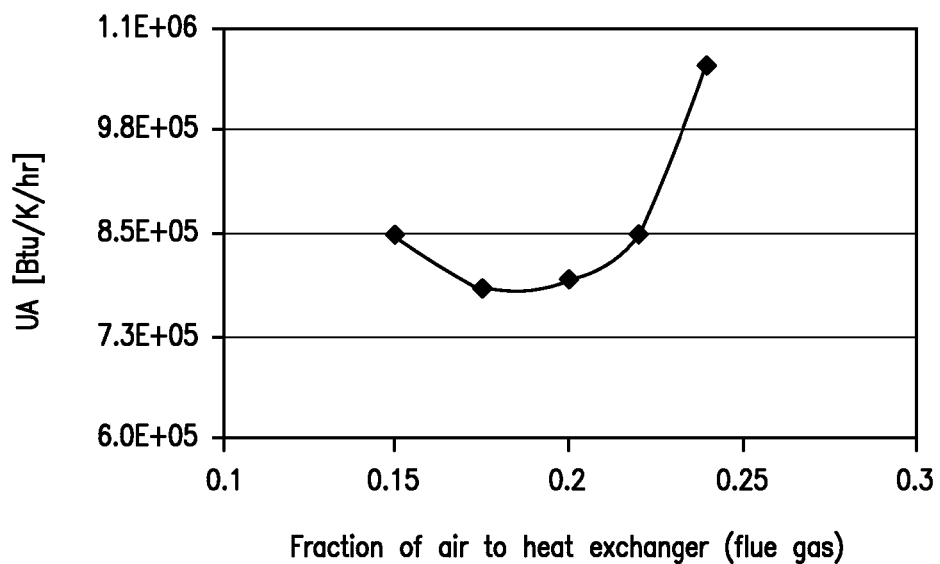
FIG. 3 is a graphical representation of a required total product of the heat transfer coefficient and heat transfer area against the part of the air that exchanges heat solely with the flue gas stream.

FIG. 3, set forth a further calculation based on the data developed in the above table in a graphical form. As is apparent from the graph, a minimum UA is obtained where the flow rate of second subsidiary oxygen-containing stream 54 is roughly 18 percent of the flow rate of oxygen-containing stream 42 and therefore the remainder of the flow is concentrated in first subsidiary oxygen-containing stream 48. For a constant heat transfer coefficient, this also represents the minimum heat transfer area required to conduct the process of the above example and therefore, the minimum costs to fabricate the heat exchangers.

Figure 4:
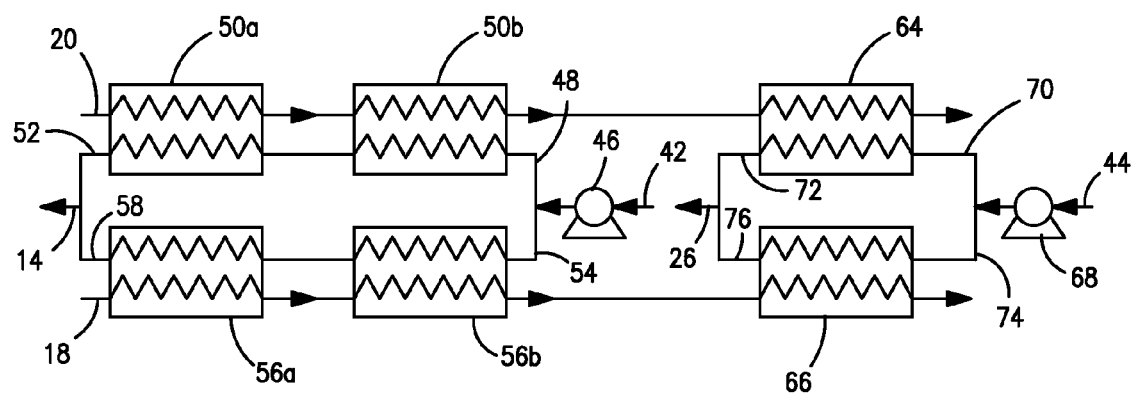
FIG. 4 is a schematic, fragmentary process flow diagram of an alternative embodiment of a heat recovery system in accordance with the present invention.

With reference to FIG. 4, costs can further be reduced by splitting the heat exchange duty of heat exchangers 50 and 56 into two heat exchangers 50a and 50b and 56a and 56b. Heat exchangers 50a and 56a operate at higher temperatures than heat exchangers 50b and 56b. As such, the use of expensive, high temperature materials can be concentrated within the higher temperature heat exchangers 50a and 56a to also reduce fabrication costs.

Figure 5:
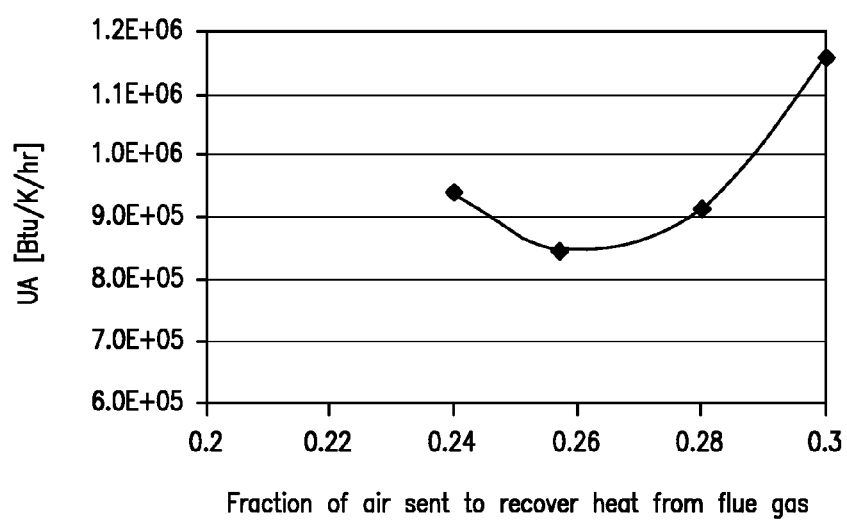
FIG. 5 is a graphical representation of a product of the overall heat transfer coefficient and the heat transfer area versus the fraction of the air that exchanges heat solely with the flue gas.

With reference to FIG. 5, again using the data of the above table, the calculated split of oxygen-containing stream 42 involves second subsidiary oxygen-containing stream 54 being roughly 26 percent of the total flow within oxygen-containing stream 42 and with the remainder of the flow within first subsidiary oxygen-containing stream 48.

Figure 6:
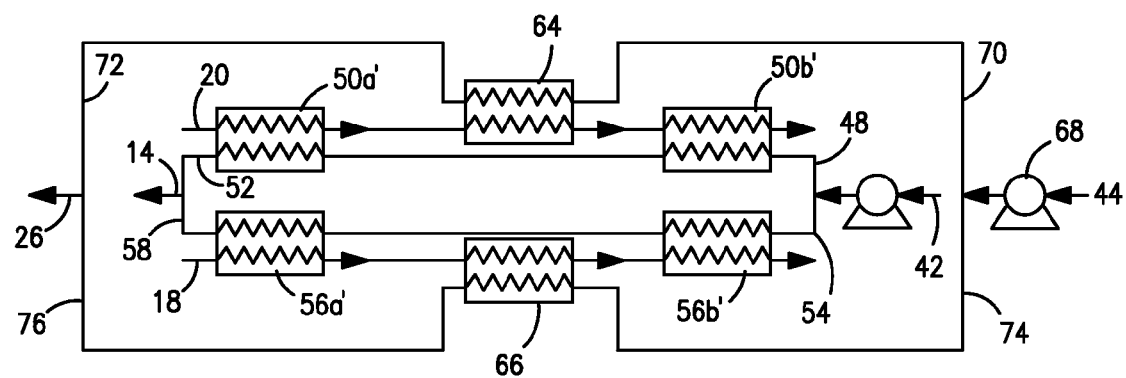
FIG. 6 is a schematic, fragmentary process flow diagram of an alternative embodiment of a heat recovery system in accordance with the present invention.

With reference to FIG. 6, another economizing method can be taken when boiler feed water stream 44 is available at high temperature. In such embodiment, the heat exchange duty for oxygen-containing stream 40 can be split between two sets of heat exchangers 50a'; 50b' and 56a'; 56b', each set operating at higher and lower temperatures. In such embodiment, heat exchangers 50b' and 56b' are located downstream of heat exchangers 64 and 66 with condensation of water within flue gas stream 18 occurring in heat exchanger 56b'. The use of expensive, high temperature materials are therefore confined to heat exchangers 50a' and 56a' to also produce a cost savings.

While the present invention has been described with reference to a preferred embodiment, as will occur to those skilled in the art, numerous changes, additions and omissions can be made without departing from the spirit and scope of the present invention as set fort in the appended claims.

We claim:

1. A method of heating process streams fed to boiler utilizing an oxygen transport membrane unit, said method comprising:

feeding process streams to the boiler that include a heated boiler feed water stream and a heated oxygen-containing stream;

the heated boiler feed water stream being heated within the boiler through indirect heat exchange with a retentate stream and a flue gas stream to generate steam, the flue gas stream being produced by combustion of a fuel supported by oxygen separated from the heated oxygen-containing stream by the oxygen transport membrane device, thereby to also produce the retentate stream with a higher mass flow rate than the flue gas stream;

indirectly transferring heat from the retentate stream to a first subsidiary oxygen-containing stream and thereafter, to a first subsidiary boiler feed water stream, thereby to produce a heated first subsidiary oxygen-containing stream and a first heated boiler feed water stream;

indirectly exchanging further heat from the flue gas stream to a second subsidiary oxygen-containing stream and thereafter, to a second subsidiary boiler feed water stream, thereby to produce a second heated oxygen-containing stream and a second heated boiler feed water stream;

combining the heated first subsidiary oxygen-containing stream and the heated second subsidiary oxygen-containing stream to form the heated oxygen-containing stream and combining the heated first boiler feed water stream and the heated second boiler feed water stream to form the heated boiler feed water stream; and minimizing heat exchange area required for the indirect heat exchange between the retentate stream, the flue gas stream and the oxygen-containing stream, the boiler feed water stream by providing the first oxygen-containing stream with a greater mass flow rate than that of the second oxygen-containing stream.

2. The method of claim 1, wherein water contained within the flue gas stream condenses by the indirect heat exchange of the flue gas stream and the second subsidiary boiler feed water stream.

3. The method of claim 2, wherein the indirect heat exchange between the retentate stream and the first subsidiary oxygen-containing stream and the flue gas stream and the second subsidiary oxygen-containing stream are each conducted within two heat exchangers operating at higher and lower temperatures and upstream of the indirect heat exchange with the first boiler feed water stream and the second boiler feed water stream.

4. The method of claim 1, wherein:

the indirect heat exchange between the retentate stream and the first subsidiary oxygen-containing stream and the flue gas stream and the second subsidiary oxygen-containing stream are each conducted within two heat exchangers operating at higher and lower temperatures and with the indirect heat exchange of the retentate stream and the first boiler feed water stream and the indirect heat exchange of the flue gas stream and the second boiler feed water stream occurring between the two heat exchangers.

5. The method of claim 4, wherein water contained within the flue gas stream is condensed during the indirect heat exchange of the flue gas stream with the second subsidiary oxygen-containing stream.

6. The method of claim 1, wherein the heated oxygen-containing stream is further heated by introducing the oxygen-containing stream into a duct burner and combusting a fuel within the duct burner.

7. The method of claim 1, wherein the oxygen-containing stream is air.

* * * * *